United States Patent

Wandernoth et al.

[11] Patent Number: 6,078,786
[45] Date of Patent: Jun. 20, 2000

[54] METHOD AND DEVICE FOR MEASURING THE DISTANCE BETWEEN TWO STATIONS CONNECTED BY A COMMUNICATIONS CHANNEL

[75] Inventors: Bernhard Wandernoth, Kirchberg; Christoph Peter Serbe, Hüttlingen, both of Switzerland

[73] Assignee: Contraves Space AG, Zurich, Switzerland

[21] Appl. No.: 08/931,646

[22] Filed: Sep. 16, 1997

[30] Foreign Application Priority Data

Oct. 5, 1996 [CH] Switzerland ............. 2415/96

[51] Int. Cl.[7] .................................................. H04B 7/19
[52] U.S. Cl. ................. 455/13.2; 455/427; 342/118; 375/356; 370/324
[58] Field of Search ................... 342/387, 352, 342/353, 354, 355, 356, 357.08, 458, 47, 118, 125, 135; 367/118; 455/12.1, 13.2, 427; 375/358, 356; 370/324

[56] References Cited

U.S. PATENT DOCUMENTS

| | | | |
|---|---|---|---|
| 3,742,498 | 6/1973 | Dunn | 455/13.2 |
| 4,004,098 | 1/1977 | Shimasaki | 370/325 |
| 4,313,183 | 1/1982 | Saylor | 367/128 |
| 4,320,503 | 3/1982 | Acampora | 455/13.2 |
| 4,494,211 | 1/1985 | Schwartz | 364/571 |

OTHER PUBLICATIONS

U.S. application No. 08/882,266, Czichy et al., filed Jun. 26, 1997.

Merrill I. Skolnik, Editor–in–Chief, "Radar Handbook", 1970, pp. I–8 to I–14.

Geiger et al., "New OTDR Technique for Monitoring the Range of Reflective Markers", 10th Optical Fibre Sensors Conference, pp. 150–153.

*Primary Examiner*—Edward F. Urban
*Assistant Examiner*—Isaak R. Jama
*Attorney, Agent, or Firm*—Townsend and Townsend and Crew, LLP; Guy W. Chambers, Esq.

[57] ABSTRACT

The invention relates to a method and a device for distance measuring between two stations (A1, B1) connected by a communication channel. The method is based on a command structure, wherein the satellite (A1, B1), by means of which a distance is to be determined, sends a range request (3) via an inter-satellite communication channel to the other satellite (A1or B1), which thereupon acknowledges this range request (3) with an answer (4). The distance is determined from the corresponding measurement of the cycle time. The range request (3) and the corresponding answer (4) are transmitted in a multiplexed communication channel.

16 Claims, 9 Drawing Sheets

METHOD AND DEVICE FOR MEASURING THE DISTANCE BETWEEN TWO STATIONS CONNECTED BY A COMMUNICATIONS CHANNEL

FIELD OF THE INVENTION

The invention relates to a method for measuring the distance between two stations, in particular between two satellites, which are connected by a communications channel, and to a device for executing the method.

BACKGROUND OF THE INVENTION

In satellite systems consisting of several satellites, it is often desirable or necessary to know the distance between the satellites in order to aid the regulation of their positions and to prevent collisions. Although measuring from the ground, which has been practiced up to now, permits a comparatively exact distance measurement when two satellites are in close vicinity to each other, it is only possible with great elaboration.

For the distance determination necessary because of this between the satellites within a grouping placed into a tight sequence, its is possible to use known methods.

To be mentioned are the measurement of the traveling time of a short pulse on the path to be measured between two satellites, the correlation of a known, but random-appearing sequence of data bits (pseudo-random sequence).

Both methods require a transmission bandwidth which is inversely proportional to the required measurement resolution. Examples of solutions for both principles can be found in the current literature regarding radar technology. In every case an apparatus, which is separately intended for this purpose, requires a defined volume and has considerable weight for space travel applications and considerable energy requirements, which is considered to be a serious disadvantage.

For example, there exist optical apparatus and methods for the exact determination of signal traveling times or distances, wherein it is possible by means of a correlation between transmitted and received pseudo-random sequences to fall below the distance resolution given by the transmission bandwidth (H. Geiger et al., "New OTDR Technique for Monitoring the Range of Reflective Markers", 10th Optical Fiber Sensors Conference, p. 150 to 153). Applied to optical connections between satellites, there exists the additional property of the high angular resolution of an optical system.

OBJECT AND SUMMARY OF THE INVENTION

It is therefore the object of the instant invention to avoid the disadvantages of the prior art and to disclose a dependable possibility of performing exact traveling time and distance measurements while making use of an existing transmission system.

This object is attained in accordance with the invention by means of a method with the features recited in the characterizing portion of claim 1.

An advantage of the method in accordance with the invention has the result that the distance measurement is performed over already existing high-rate data links between the movable stations of a network, for example between satellites, so that separate distance-measuring devices are not required.

A syncbit method is described in German Letters Patent DE-PS 41 10 138 C1 as an advantageous way for synchronizing the phase of the superimposed light with that of the signal light. To this end the light of the optical transmitter is set at regular time intervals for the length of a data bit to the phase of the light to be superimposed in the receiver. For small deviations of the phase of the superimposed light, the photo flow generated in the detector is approximately proportional to the phase difference. The error signal obtained by means of this can be used for adjustment. The distance between individual syncbits is determined by the phase stability of both laser systems. As a rule, each 9th to 33rd data bit is replaced by a syncbit, by means of which the theoretically maximally possible distance between two syncbits cannot be attained in most cases.

A further patent application, Swiss Application No. 2414/1996, includes the use of a small proportion of the regularly inserted syncbits for the low-rate transmission of data. This is achieved in that within regular intervals within the continuous sequence of the syncbits inserted into the useful data flow the phase of the light used for the transmission takes on not the set value of the phase of the superimposing light, but a value which is also suitable for data transmission. The receiver already has the features required for extracting the syncbits and can be retrofitted with little outlay for the detection of the inserted data bits. In place of a demultiplexer, only a counter is required for detecting the interval between the data bits inserted into the sequence of the syncbits. Since only a small number of the syncbits is contaminated in this way, there is no appreciable impairment of the actual function of these signals. At the same time the data rate of the channel which was additionally obtained by this falls to the desired extent to lower values in comparison with the useful data rate. However, the contamination of a syncbit cannot be detected with the same assurance as a differentiation can be made between the two signal levels used for transmitting the useful data, since the difference in the photo flow is halved. Since optical output is converted into electrical current and the square of the photo flow is proportional to the output of the detected signal, four times the optical output of the signal light is required to compensate the loss. For increasing the transmission dependability it has therefore been shown to be advantageous to code the single bit to be transmitted in the sub-channel by several successive signals, i.e. syncbit violations. An even number of successive alternating signal levels in particular assures a mean value-free signal, by means of which an erroneous tracking of the phase of the superimposing light is prevented.

An advantage because of the described method results in that an sub-channel can be transmitted via an existing optical transmission channel without the need for more output or larger bandwidth. A further advantage lies in the very simple technical implementation, since no special and expensive multiplexers and demultiplexers need to be used. Finally, it is possible to achieve a very low bit error probability in the sub-channel by means of very simple steps.

The advantages of the method in accordance with the invention for measuring the distance between movable stations or satellites lie in that no separate distance measuring device is required, a high degree of accuracy of the distance measurement is possible, the additional outlay for technical circuitry is low, and the additional output requirement is low.

The advantage of a combination of the syncbit method with the transmission of an sub-channel together with the transmission of the range request and answer in this subchannel consists in that, in spite of a low-rate transmission, the exactly defined position of the syncbit in the useful data flow makes it possible to perform the distance measurement with a resolution which corresponds to half the length of a useful data bit in the transmission path. Further details, characteristics and advantages of the invention ensue not only from the claims and the characteristics to be taken from them, either by themselves or in combination, but also from the following description of the preferred exemplary embodiments.

DETAILED DESCRIPTION OF THE PREFERRED EMBODIMENTS

Figure 1:
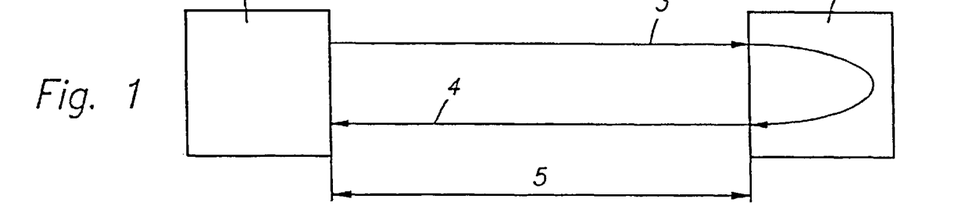
FIG. 1 shows a schematic representation of the method for measuring the distance between two satellites.

FIG. 1 schematically shows the process of the distance measurement between the satellite A1 and the satellite B2. The method is based on a command structure wherein the satellite which is used for determining the distance transmits a range request 3 via an inter-satellite communications channel to the other satellite, which thereupon acknowledges this range request 3 with an answer 4.

The distance is produced as follows:

$$\text{distance} = c \cdot T_R = c \cdot \frac{T_{cycle} - T_1 - T_2}{2}$$

wherein c is the speed of light in space, $T_R$ the traveling time 5 from one satellite to the other, $T_{cycle}$ the total cycle time, and $T_1$ and $T_2$ are the delays caused by the handling times (processing times) in the satellites.

If the two following conditions are met, namely that the chronological position of the commands in the data flow as well as the time for processing the commands in both satellites participating in the distance measurement are exactly known, the measurement of the distance is possible in the chronological resolution of half a data bit of the used communications channel. For example, with a data rate of 1 Gbit/s, a resolution of 15 cm is given.

It is possible by means of a correlation of the data bits to push the resolution even further below the half bit length.

Generally, every data transmission path is suitable for the implementation of the distance measurement in accordance with the invention, as long as the data rate for achieving the desired resolution is sufficient. Therefore only the command must be able to be multiplexed in the data flow, wherein it is essential that their chronological position in the data flow is known exact to one bit.

The implementation is particularly simple with transmission channels in which a low-rate sub-channel is available in a bit-synchronous manner. As a rule, such sub-channels are established for system management and the transmission of operating parameters. In such an arrangement the commands and information for distance measuring can be transmitted via this sub-channel, so that the transmission of the useful data remains untouched.

Figure 2:
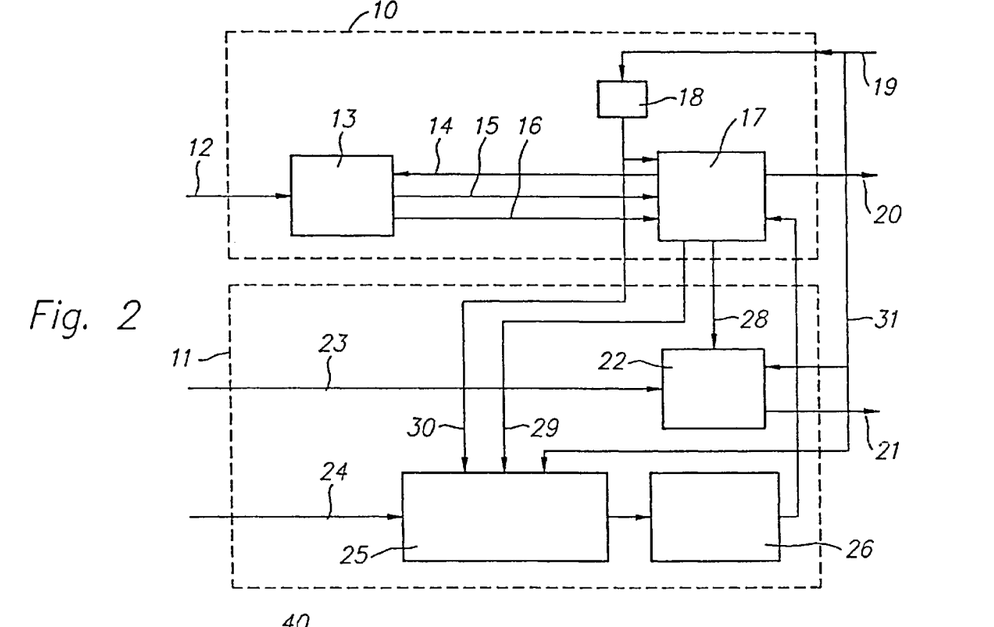
FIGS. 2, 4, 6, and 11 show exemplary block circuit diagrams for various implementations of the distance measurement in a portion on the transmitter side of a satellite.

FIG. 2 shows a block circuit diagram for the implementation of the distance measurement in a portion on the transmitter side of a satellite, with an sub-channel processing unit 10 and a distance measuring unit 11. The sub-channel processing unit 10 has a data bus 12, which constitutes the input of an interface 13. The output of the interface 13 is connected via a first data line 16 with an input of a multiplexer 17. A splitter 18 constitutes a further input of the multiplexer 17. One input of this splitter 18 is fed by the channel data timing pulse 19. The multiplexer 17 is furthermore in contact with the interface 13 via respectively one forward timing line 14 and one return timing line 15.

The distance measuring unit 11 has a first counter 25, whose first input is connected via a third line 24 with the receiver (see FIG. 3) of the satellite. Further inputs of this first counter 25 are connected on one side via a timing line 31 with the channel data timing pulse 19, and on the other side via a frame timing line 30 with the output of the splitter 18. A start input of a second counter 22 of the distance measuring unit 11 is also connected with an output of the multiplexer 17 of the sub-channel processing unit 10. The stop input of this second counter 22 is connected via a second line 23 with the receiver (see FIG. 3) of the satellite.

The output of the first counter 25 is connected with a coder 26.

The sub-channel processing unit 10 in FIG. 2 is used for the low-rate transmission of operationally relevant data in the sub-channel and consists of the interface 13, the multiplexer 17 and the splitter (=counter) 18.

The data to be transmitted through the sub-channel are sent via a parallel or serial data bus 12 from a system controller (control computer) to the interface 13, whose job it is to transfer the data to be transmitted via the first data line 16 to the (sub-channel encoder/frame) multiplexer 17 at the required times provided by the timing lines 14 and 15.

The multiplexer has the job of converting the data into appropriate syncbit violations, such as required by the method for transmitting a sub-channel in accordance with Swiss patent application 2414/1996. This of course leads only to relatively sparsely inserted syncbit violations, which in addition take place in a multiple, even number per bit alternatingly sequentially and with corresponding pauses between the individual bits to be encoded in order not to endanger the synchronization function. The channel data timing pulse 19 divided by N by the frame timing line 30 is supplied to the sub-channel encoder/multiplexer 17 by the splitter 18, since only every Nth bit in the useful data flow is a syncbit, of which a small portion is used for the sub-channel. The information, whether the set phase of the superimposing light of the receiver or a deviation by ±90 degrees is to be transmitted by the syncbit actually to be inserted for the transmission of data, is sent via a second data line 20 to the channel multiplexer, whose job it is to set the phase of the light of the transmitter in the time interval provided for the syncbit in accordance with the signal present at the second data line 20.

Figure 3:
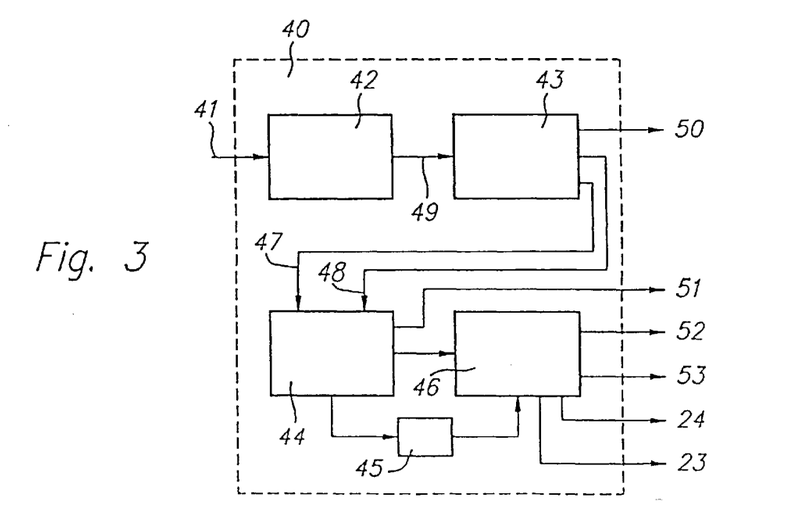
FIGS. 3, 5 and 7 show exemplary block circuit diagrams for various implementations of the distance measurement in a portion on the receiver side of a satellite.

FIG. 3 shows a block circuit diagram for implementing the distance measurement in a portion on the receiver side of a satellite with a further sub-channel processing unit 40. This sub-channel processing unit 40 contains channel data 41 of the sub-channel, which are passed on to a detection unit 42. The output of the detection unit 42 is connected via a further line 49 with an input of a timing regenerator 43. Two outputs of the timing regenerator 43 are connected via the two timing lines 47 and 48 with the inputs of a frame synchronizer 44. An output of the frame synchronizer 44 is connected with the input of a demultiplexer 46. A further output of the frame synchronizer 44 is connected with the input of a phase-locked loop timing oscillator 45, whose output forms a further input signal for the demultiplexer 46. A further output of the frame synchronizer 44 makes the frame timing pulse for the sub-channel available at a timing line 51 at the output of the sub-channel processing unit 40. The portion on the receiver side of a satellite is connected with the portion on the receiver side of a satellite via the two data lines 23 and 24. The sub-channel data are available via bus lines 52 and 53.

The sub-channel processing unit 40 represented in FIG. 3 is located inside the receiver. The sub-channel data are selected from the channel data by the detection unit 42. As described in Swiss application 2414/1996, this is performed by detecting the syncbits and their violations which occur in periodically repeated time intervals provided by the uncontaminated syncbits. The syncbits can be recognized by a low signal level, which corresponds to the small phase difference between the lightwave of the transmitter and the superimposing light wave which is created between the transmission of two syncbits. By means of the time of several already transmitted syncbits it is possible to estimate the time of the appearance of subsequent syncbits, and the signal level measured at that time will be either assigned to an uncontaminated syncbit or will be detected as the contamination of a syncbit. The signal level scanned in the time intervals occupied by the contaminated and uncontaminated syncbits is forwarded via a further line 49 to the sub-channel timing generator 43, in which the individual bits transmitted in the sub-channel are recovered from the syncbit violations on the basis of the existing signal level, possibly by means of a soft decision. A timing signal is additionally generated from the recovered bit sequence. Both signals are transferred via timing lines 47 and 48 to the sub-channel frame synchronizer 44, in which a control signal for the phase-locked looped timing oscillator 45 is generated, whose timing signal makes it possible for the sub-channel demultiplexer decoder 46 to demultiplex the sub-channel data, which were serially transmitted in a time multiplex frame, parallel on the bus lines 52 and 53 of the sub-channel data bus. Two bit sequences are furthermore detected, which have been agreed upon for the request for a distance measurement and an answer to the request for a distance measurement. The detection of the former is signaled via the third line 24, that of the latter on the second line 23. The timing line 50 signals, whether the sub-channel timing pulse was generated, the timing line 51 signals, whether the frame of the sub-channel has been detected. A distance measurement by means of the devices represented in FIG. 2 and FIG. 3 takes place as follows:

A bit sequence of additional data, which has been agreed upon as a request for a distance measurement, is sent by the system controller (control computer) via the data bus to the interface 13. This bit sequence is converted by the multiplexer 17 into the corresponding syncbit sequence and is sent to the channel multiplexer. This bit sequence in the multiplexer 17 is simultaneously detected as a request for a distance measurement, and thereby the second counter 22 is started via a fourth line 28. The former now starts to count, by means of the channel data timing pulse 19, the number of the total bits transmitted in the useful data channel. The contaminated syncbits inserted into the channel data reach the receiver of the opposite station, in which the bit sequence agreed upon as the request for a distance measurement is detected in the sub-channel processing unit 40, which is signaled on the third line 24. The third line 24 conducts the signal to the counter 25 of the opposite station, which now starts to count the number of syncbits by means of the frame timing pulse of the frame timing line 30 until the start of the return transmission of the answer to the request for a distance measurement is signaled by the multiplexer 17 of the opposite station via the line 29. Since in general the signal of the request for a distance measurement arrives at the counter 25 between two syncbits, the number of useful channels bits located between them is also counted via the line 31. A static delay is furthermore added, by which the transition times of the signals through the various functional blocks are taken into consideration.

Both numbers flow into the coding of the coder 26 of the answer to the request for a distance measurement, which is conducted into the multiplexer 17 of the opposite station. Besides an agreed upon bit sequence, the answer also contains the syncbit for its marking and useful data intervals counted in the counter 25, as well as the static delay, by means of which the processing time in the opposite station can be determined in the requesting station and subtracted from the total delay time.

The answer to the request for a distance measurement is now transmitted back via the sub-channel to the requesting station. The coded answer of the opposite station is detected in the sub-channel processing unit 40 of the requesting station, and this is signaled via the line 23. The line 23 conducts this signal to the counter 22 of the requesting station, so that the counting of the useful channel bits is stopped. Its number is now available on the bus 21 to the system controller (control computer) for the determination of the distance. This number is multiplied in the system controller (control computer) by the length of the individual bits in the useful data channel, and the processing times in both stations are subtracted from the delay time obtained in this way. The processing time in the opposite station results from the number of syncbits and useful data bits transmitted until the transmission of the answer by the opposite station and detected by the counter 25, as well as the (fixed) propagation time of the request inside the opposite station added to the answer. This information is available to the system controller after it has been transmitted to it via the lines 52 and 53. The remaining time difference between the request and the answer is halved, since the track between the two stations is traveled twice, and is multiplied by the group speed (speed of light) given by the medium.

Figure 4:
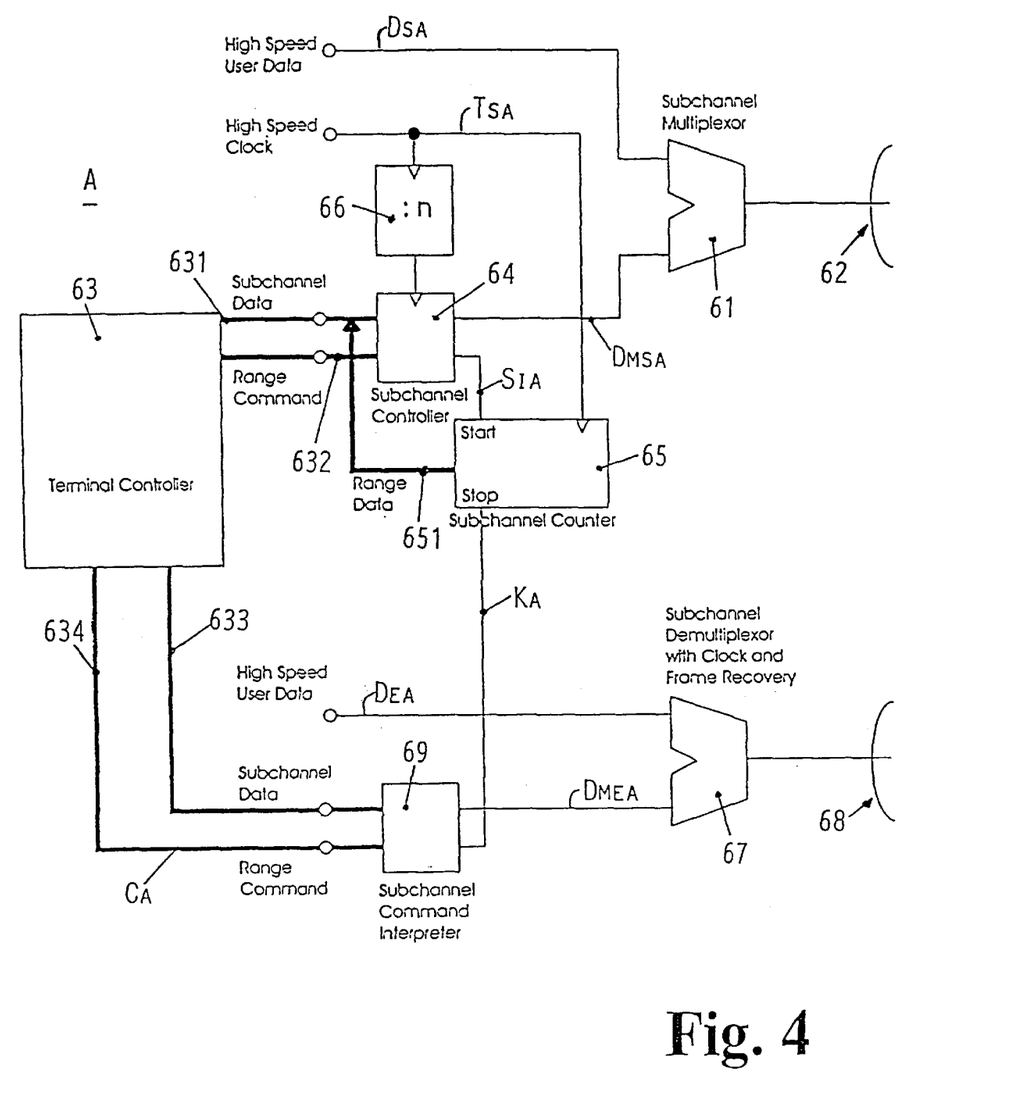
Figure 5:
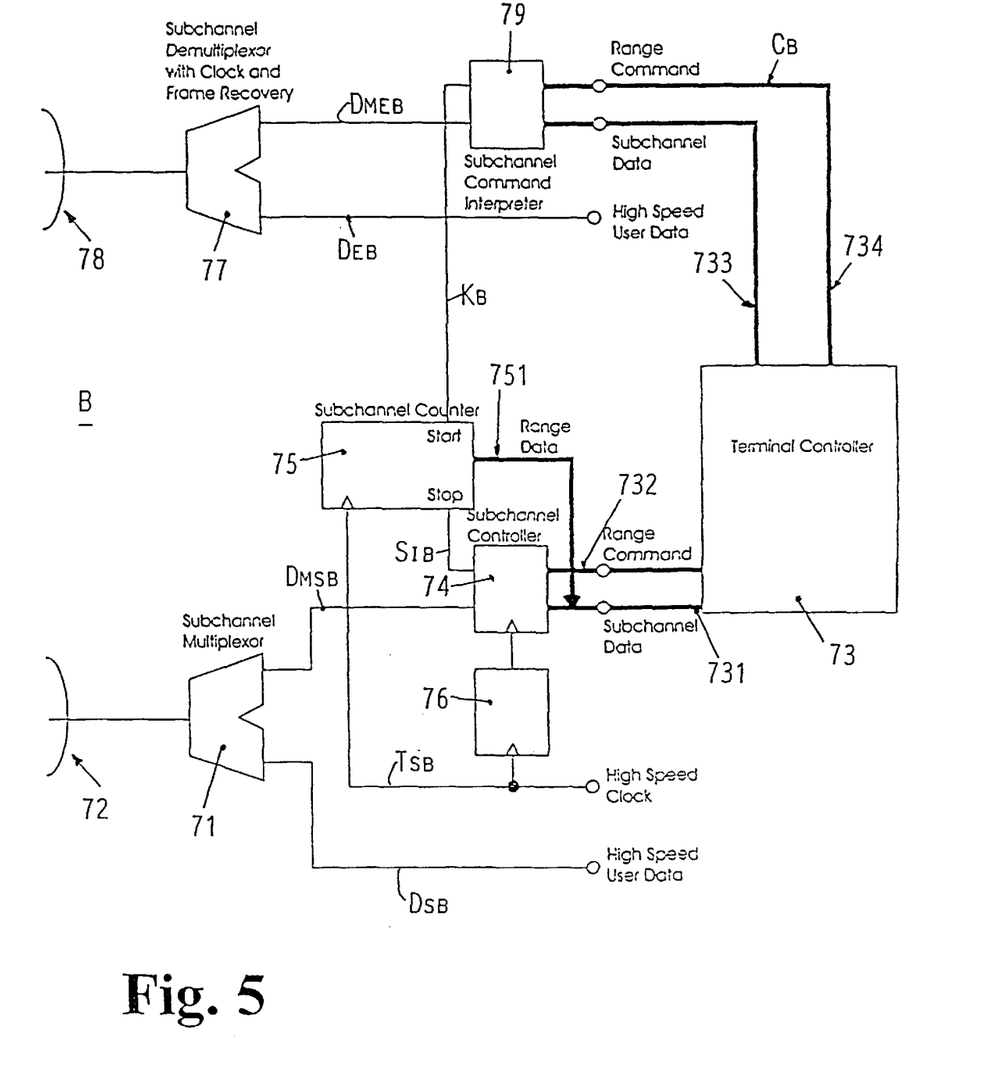

In a further embodiment of the invention, the method for distance measuring by means of a multiplexed sub-channel can be performed, for example, with the aid of a terminal A in accordance with FIG. 4 and an opposite terminal B in accordance with FIG. 5. The terminals A and B are also called first and second station. A subchannel multiplexer 61 is provided in the terminal A, whose output signal is provided to a transmitter unit 62. On the input side, the sub-channel multiplexer 61 can be provided with, for example, several useful data signals Dsa, which have already been multiplexed and are transmitted at a high bit rate, as well as with a sub-channel data signal Dmsa, which is generated in a terminal controller 63 and is conducted via a bus 631 and a sub-channel controller 64, which is also connected to the terminal controller 63 via a further bus 632 for distance measuring control signals, also called range control signals (range commands). A control signal Sia is also generated in the terminal controller 63, which is supplied via the bus 631 or possibly the bus 632 and via the sub-channel controller 64 to a sub-channel counter 65. A timing signal Tsa of a high bit rate is supplied to the timing input of the counter 65 as well as via a splitter 66 to the timing input of the controller 64. A sub-channel demultiplexer 67 is also provided in the terminal A, whose input side is connected with a receiver unit 68 and which is designed to emit at the output side, for example, several multiplexed useful data signals Dea of a high bit rate as well as a sub-channel data signal Dmea which is supplied to the terminal controller 63 via a sub-channel discriminator (interpreter) 69 and a data bus 633. The subchannel discriminator 69 is designed to deliver a range control signal Ca via a bus 634 to the terminal controller 63, and to deliver a stop or control signal Ka to the counter 65, which is additionally connected with a further range data bus 651 connected to the bus 631, in order to deliver range data signals.

In the opposite terminal B there is a sub-channel multiplexer 71, whose output signal is supplied to a transmitter unit 72. On the input side, the sub-channel multiplexer 71 can be provided with, for example, several useful data signals Dsb, which have already been multiplexed and are transmitted at a high bit rate, as well as with a sub-channel data signal Dmsb, which is generated in a terminal controller 73 and is conducted via a bus 731 and a sub-channel controller 74, which is also connected to the terminal controller 73 via a further bus 732 for range control signals. A control signal Sib is also generated in the terminal controller 73, which is supplied via the bus 731 or possibly the bus 732 and via the subchannel controller 74 to a subchannel counter 75. A timing signal Tsb of a high bit rate is supplied to the timing input of the counter 75 as well as via a splitter 76 to the timing input of the controller 74. A sub-channel demultiplexer 77 is also provided in this opposite terminal B, whose input side is connected with a receiver unit 78 and which is designed to emit at the output side, for example, several multiplexed useful data signals Deb of a high bit rate as well as a sub-channel data signal Dmeb which is supplied to the terminal controller 73 via a sub-channel discriminator 79 and a data bus 733. The subchannel discriminator 79 is designed to deliver a range control signal Cb via a bus 734 to the terminal controller 73, and to deliver a control signal Kb to the counter 75, which is additionally connected with a further range data bus 751 connected to the bus 731, in order to deliver range data signals.

Distance measuring with the devices in accordance with FIGS. 4 and 5 by the subchannel method is performed as follows:

The initiator of the measurement is the terminal controller 63 of the terminal A (FIG. 4), which provides the signal Sia, while the opposite terminal B only reacts to an appropriate subchannel control signal.

After the sub-channel controller 64 has received a request for a distance measurement, it generates a range request signature, also called "range request", generated in the terminal controller 63. This is transmitted via the signal Dmsa via the subchannel controller 64, the sub-channel multiplexer 61 and the transmitter unit 62 to the opposite terminal B.

With the transmission of the signal Dmsa, a counting process is started in the subchannel counter 65 with the aid of the signal Sia in order to determine a numerical value n1.

The timing rate of this counter 65 has been selected to be considerably higher than the subchannel bit rate in order to achieve the highest possible resolution of the distance measurement. The timing of the useful data Dsa, for example, can be considered as the timing source, which as a rule lies considerably above the subchannel bit rate.

The signals Dmeb and Deb are separated in the demultiplexer 77 of the opposite terminal B (FIG. 5). The multiplexed signals Deb contain the same information as the signals Dsa, but delayed in time, similar applies to the signals Dmeb and DMsa. The received signal Dmeb, i.e. the range request signature, is checked in the subchannel discriminator 79, and when the signature has been recognized, the counter 75 is started by the signal Kb for determining a second numerical value n2.

The transmission of an answer is initiated in addition, for example by a control computer or the terminal controller 73 of this opposite terminal B.

Now the subchannel controller 74 transmits a range answer signature, also called "range answer", i.e. the signal Dmsb, via the subchannel multiplexer 71 and the transmitter unit 72 to the terminal A, wherein when this signal Dmsb is transmitted, the counter 75 is stopped by the signal Sib. Simultaneously the information regarding the latest counter reading n2 is transmitted via the bus 751 and this subchannel multiplexer 71 to the terminal A. It should be taken into consideration that at that time the reading n2 of the counter 75 corresponds exactly to the time which has passed between the receipt of the range request and the transmission of the range answer, i.e. the processing time in the opposite terminal B. The measurement of this processing time, for example in this case the numerical value n2, is of particular interest, because it cannot be found deterministically or in advance, since the transmission of the various signatures can only take place at defined times, namely by the subchannel bits.

Upon receipt of the range answer signature, i.e. the signal Dmea in the terminal A, the counter 65 is stopped by means of the signal Ka. The reading of this counter 65 is then transmitted via the bus 651 to the terminal controller 63.

Finally, the terminal controller 63 performs the calculation of the distance in accordance with the following equation:

$$L = c \cdot (n1 Tsa - n2 - Tsb)/2 - Ko,$$

wherein c is the speed of light and Ko a correction constant, and wherein preferably Tsa=Tsb is selected.

Figure 6:
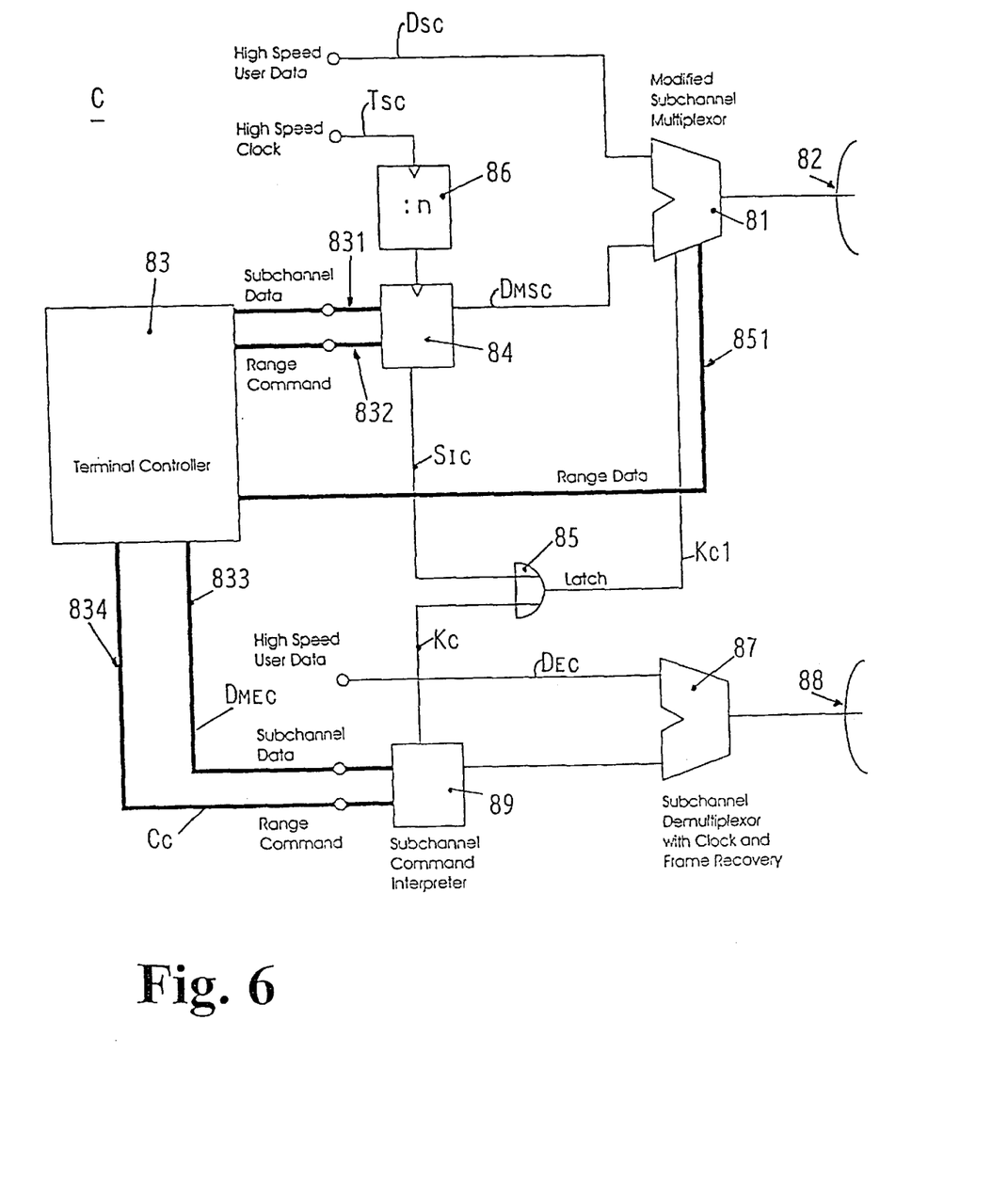
Figure 7:
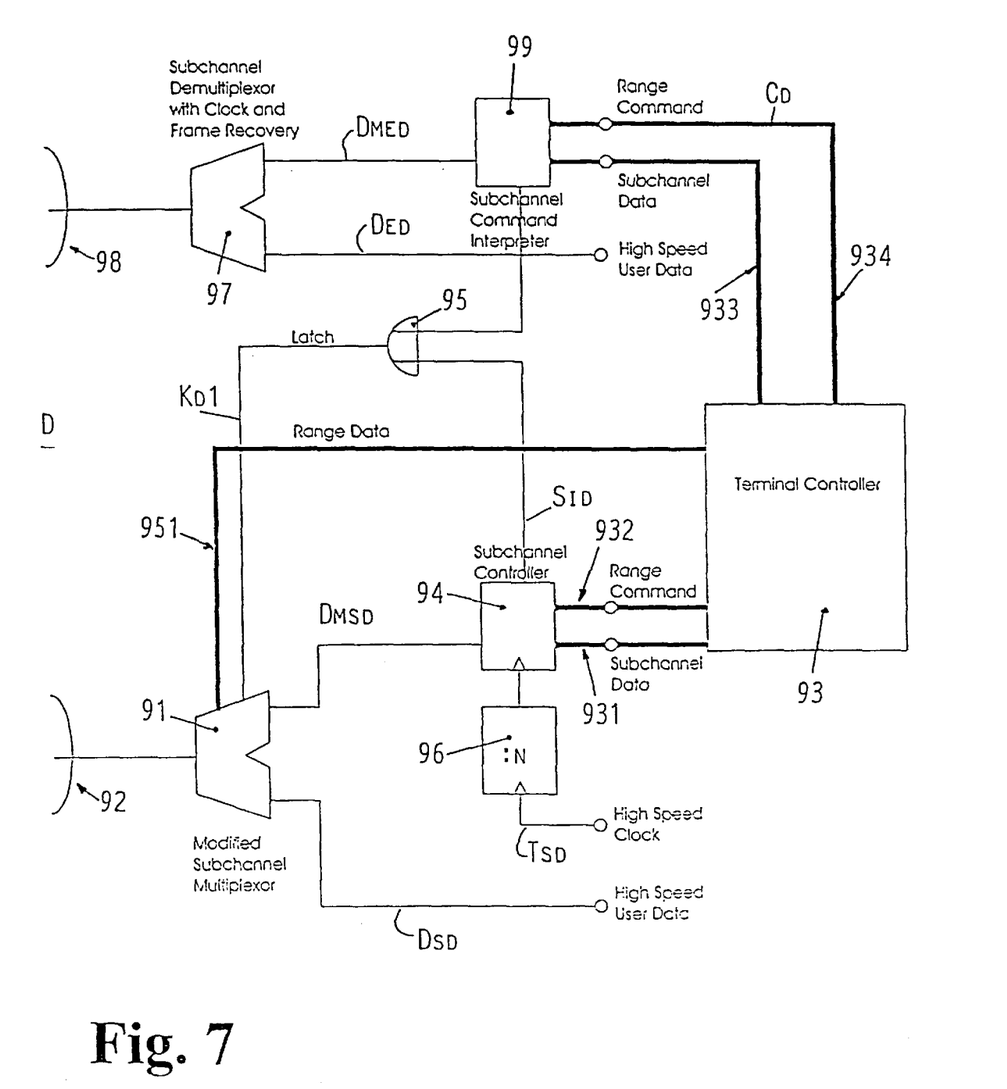

In a further embodiment of the invention, the method for distance measuring by means of a multiplexed sub-channel can be performed, for example, with the aid of a terminal C in accordance with FIG. 6 and an opposite terminal D in accordance with FIG. 7. A modified subchannel multiplexer 81 is provided in the terminal C, whose output signal is supplied to a transmitter unit 82. At the input side the sub-channel multiplexer 81 can be provided with, for example, several already multiplexed useful signals Dsc, which are transmitted at a high bit rate, as well as with a subchannel data signal Dmsc, which is generated in a terminal controller 83 and is conducted via a bus 831 and a sub-channel controller 84 which is also connected with the terminal controller 83 via a further bus 832 for range control signals. A coder in the terminal controller 83 initiates the measuring process via the bus 831 or possibly 832. At its start the sub-channel controller 84 generates the control signal Sic, which is supplied to the first input of an OR=gate 85. A timing signal Tsc of a high bit rate is supplied via a splitter 86 to the timing input of the controller 84. A subchannel demultiplexer 87 is also provided in the terminal C, whose input is connected to a receiver unit 88 and which is designed to transmit at the output side, for example, several multiplexed useful data signals Dec at a high bit rate as well as a subchannel data signal Dmec, which is supplied via a subchannel discriminator 89 and a bus 833 to the terminal controller 83. The subchannel discriminator 89 is designed to transmit a range control signal Cc to the terminal controller 83 via a bus 834. In addition, the output of the discriminator 89 is connected with the second input of the OR-gate 85, whose output signal Kc1 is supplied to a further input of the modified multiplexer 81. A further bus 851 is provided in this embodiment, at whose ends the terminal controller 83 or the multiplexer 81 is connected.

In a similar manner, a subchannel multiplexer 91, a transmitter unit 92, a terminal controller 93, a subchannel controller 94, an OR-gate 95, a splitter 96, a demultiplexer 97 and a transmitter unit 98, as well as five buses 931, 932, 933, 934 and 951 are provided in the opposite terminal D. The signals Dmed, Ded, Cd, Kd, Sid, Tsd and Dsd in FIG. 7 have functions similar to the corresponding signals Dmeb, Deb, Cb, Kb, Sib, Tsb and Dsb in FIG. 5. However, the output of the subchannel controller 94 in particular is connected with the one input of the OR-gate 85 and the output of the discriminator 99 with its other input, which provides the signal Kd1 for controlling the multiplexer 91. The terminal controller 83 and the multiplexer 91 are connected with each other by the additional bus 951.

Figure 8:
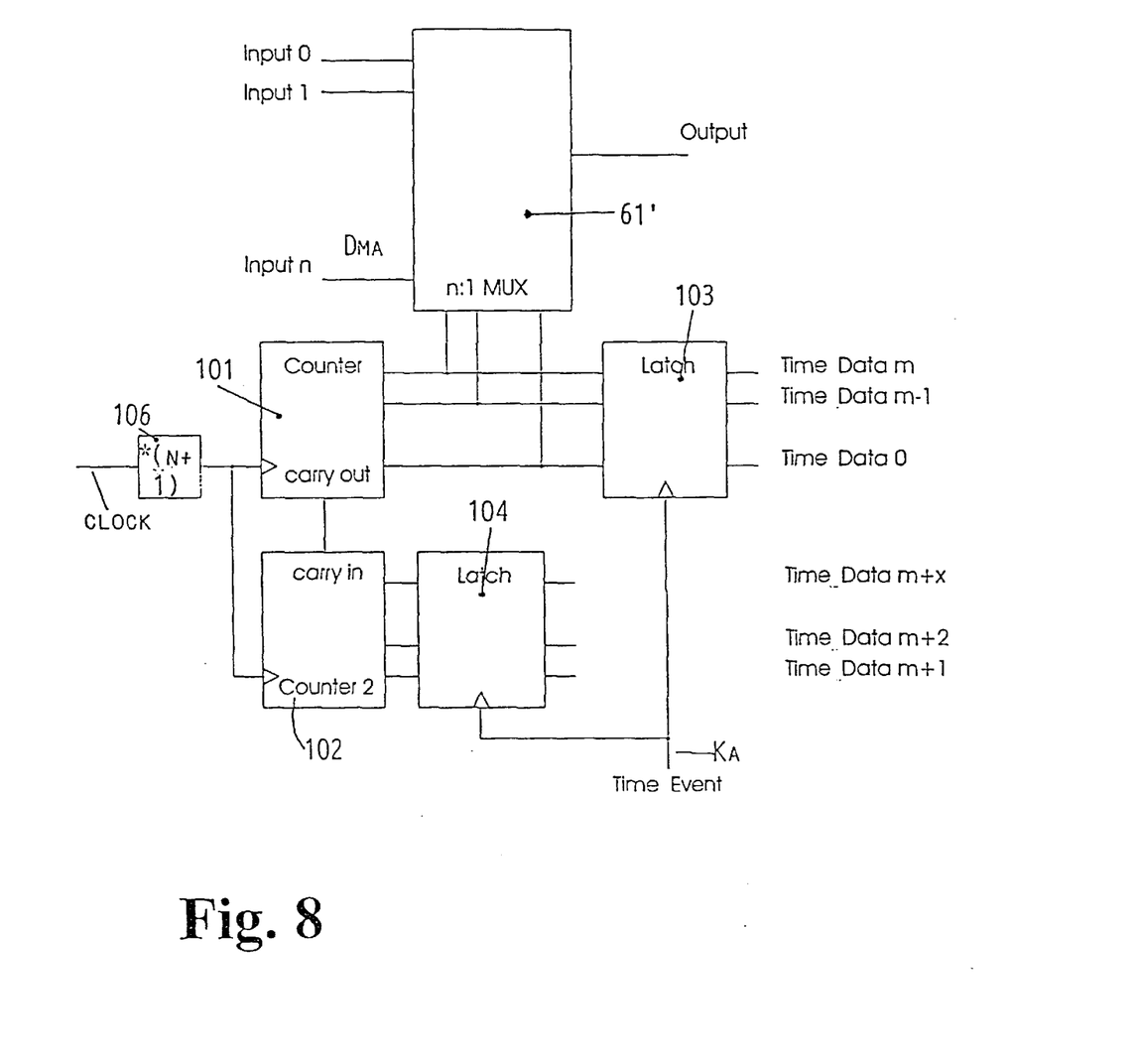
FIGS. 8, 9 and 10 show exemplary block circuit diagrams for various implementations of storage means in a portion on the transmitter and/or receiver side of a satellite.

In comparison with the multiplexer 61 in FIG. 4, the modified multiplexer 81 in the terminal C in FIG. 6 can comprise a conventional multiplexer 61', two counters 101, 102 and two temporary memory circuits 103, 104 in accordance with FIG. 8, which are also called locking circuits (latches). In this case the timing inputs of both the counters 101 and 102 are provided the output signal from, for example, a PLL multiplier 106, which preferably has a multiplication factor n+1, and with the rapid timing signal (clock) of the multiplexer. The other multiplexers and demultiplexers of course operate with a further timing (clock), not represented in the other drawing figures. In this embodiment (FIG. 8), the multiplexer 61' has a number m+1 inputs for the Id(m+1) bits of the output signal of the counter 101, which also acts on the circuit 103 (Id–logarithm to the base 2). The outputs of the circuit 103 output the corresponding bits of range data signals, which are transmitted via the bus 851 and supplied to the terminal controller 83 (see FIG. 6).

Figure 9:
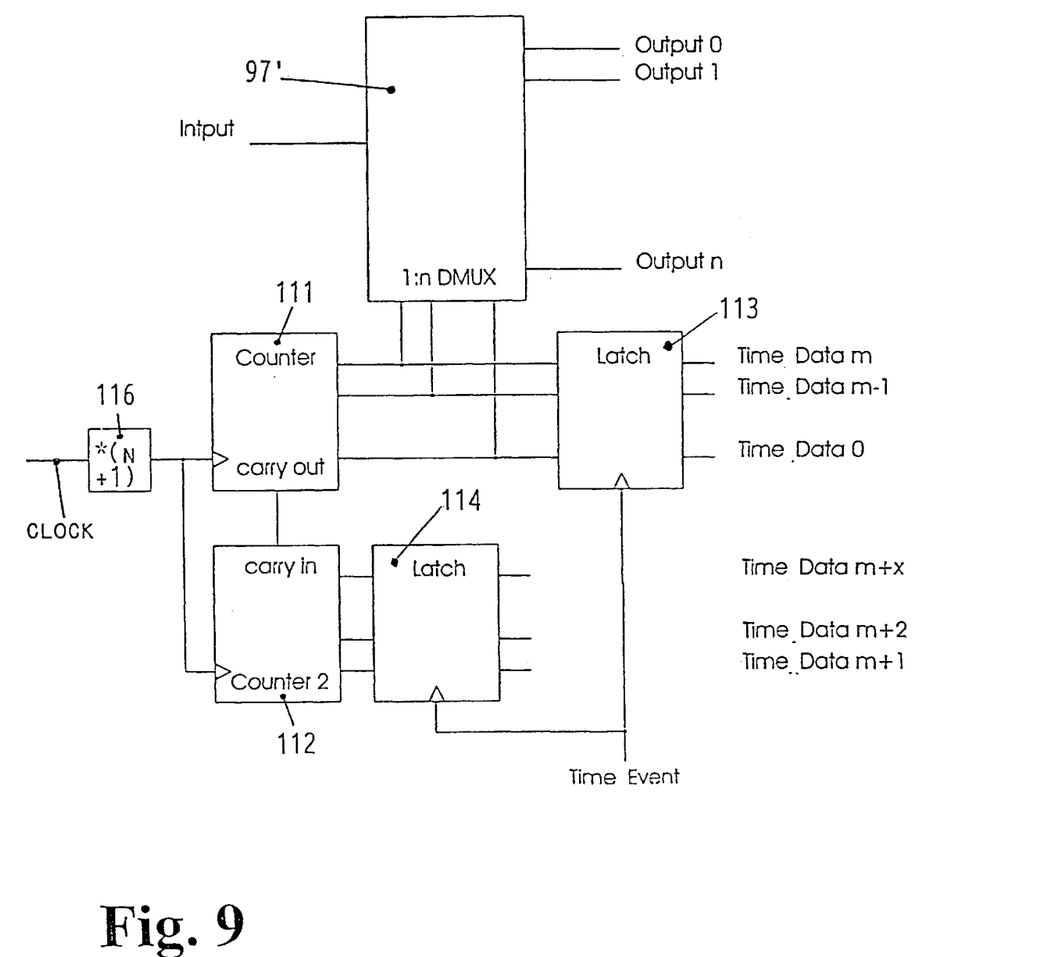

In comparison with the demultiplexer 77 in FIG. 5, the modified demultiplexer 97 in the terminal D in FIG. 7 can comprise a conventional multiplexer 97', two counters 111, 112 and two memory circuits (latches) 113, 114 in accordance with FIG. 9. In this case the timing inputs of both the counters 111 and 112 are provided with the output signal of, for example, a PLL multiplier 116, which preferably has a multiplication factor n+1, and with the rapid timing signal (clock) of the multiplexer. In this embodiment, the multiplexer 97' has a number m+1 inputs for the Id(m+1) bits of the output signal of the counter 111, which also acts on the circuit 113. The m+1 outputs of the circuit 113 output the corresponding bits of range data signals, which are transmitted via the bus 951 and supplied to the terminal controller 93 (see FIG. 7).

The elements 102, 104 and 112, 114 are used for the case where the range data signals require more than Id(m+1) bits. The counters 101 (FIG. 8) and 111 (FIG. 9) provide a time stamp on the level of the sequential subchannel frames. However, these counters are only operated at low timing rates of the subchannel, so that in principle a realization would even be possibly by means of the software of the terminal controller.

Figure 10:
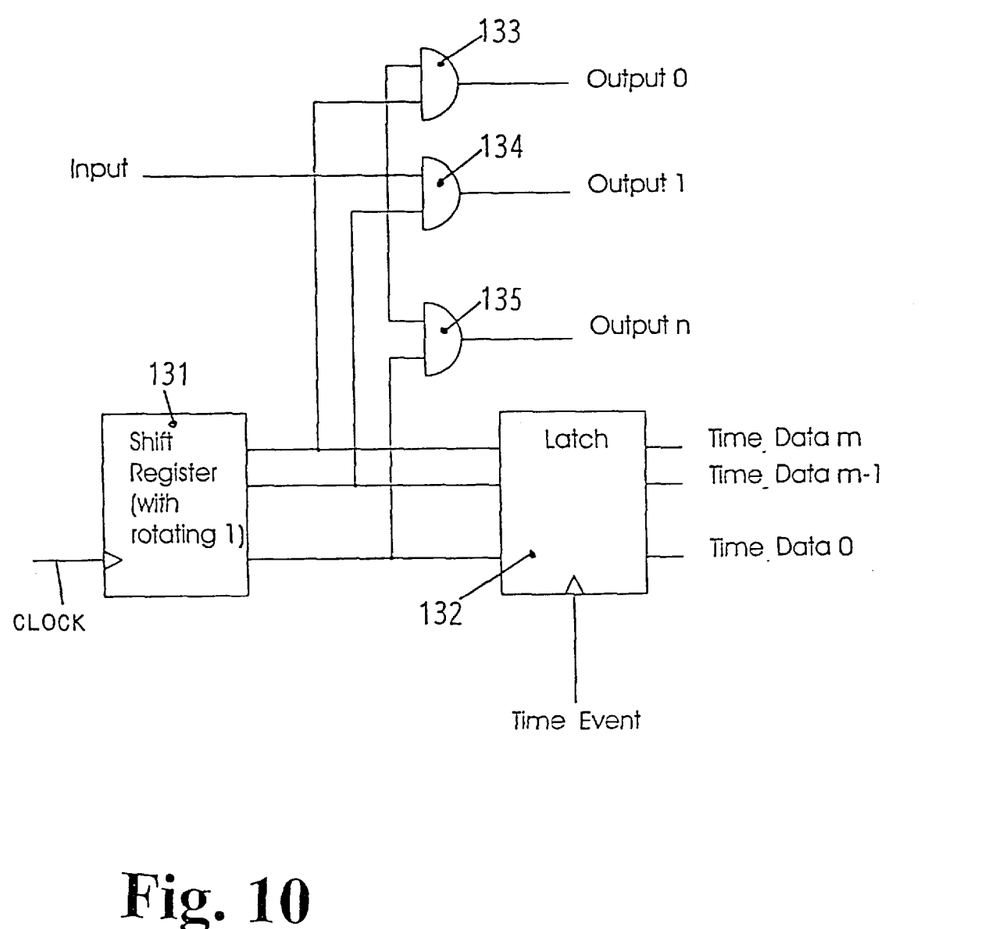

This modified method employs portions of the series-parallel (S-P) converters or parallel-series (P-S) converters which are, for example, already present in the subchannel multiplexer or demultiplexer, in place of separate counters (65 or 75 in FIGS. 4 and 5). In particular, it is also possible to use S-P and/or P-S converters, such as subchannel multiplexers and/or demultiplexers in accordance with the represented expanded embodiments as a replacement for the separate counters. These expanded embodiments basically consist of simple temporary memories which record the internal state of the multiplexer or demultiplexer at any arbitrary time. On the other hand the internal state of the counter 101 or 111 operating as S-P or P-S converter represents a sort of clock time. With frame lengths of 2, 4, 8, 16, . . . bits in particular, the address signals present at the multiplexer or demultiplexer, can be interpreted directly as a binarily represented time value. But it is possible, even with frame lengths which do not correspond to a power of 2, to clearly define times with the aid of control signals, as schematically represented in FIG. 10. This circuit, for example, comprises a shift register 113, memory means (latch) 132 and several gates 133, 134, 135, . . . However, then the measurement result is not provided as a power of 2. But it is possible to perform a simple recoding in the terminal controller in order to arrive at the customary number representation.

The distance measurement with the devices of FIGS. 6 and 7 in accordance with the modified sub-channel method is performed as follows:

The initiator of the measurement is the terminal controller 83 of the terminal C (FIG. 6), which provides the signal Sic, while the opposite terminal D only reacts to an appropriate sub-channel control signal.

After the sub-channel controller 84 has received a request for a distance measurement, a signature "range request" generated in the terminal controller 83, i.e. the signal Dmsc, is transmitted via the multiplexer 81 (FIG. 6) and the transmitter unit 82 to the opposite terminal D.

In the process, when transmitting the signature, the terminal time with the high resolution of the rapid data timing pulse is temporarily stored in the locking circuit 103 and, if necessary, also 104, and is subsequently transferred via the bus 851 into the terminal controller 83, which corresponds to a time t1.

The signals Dmed and Ded are separated in the demultiplexer 97 of the opposite terminal D (FIG. 7). The multiplexed signals Ded contain the same information as the signals Dsc, but arrive after a time delay; similar applies to the signals Dmed and Dmsc. The signal Dmed, i.e. the signature "range request", is checked in the subchannel discriminator 99. Upon recognizing the signature, the terminal time of the terminal D is now also determined, which corresponds to a time t2.

In addition, the transmission of an answer is initiated by a control computer or by the terminal controller 93 of this opposite terminal D in that an appropriate command signal Sid is given to the sub-channel controller 94.

The sub-channel controller 94 now transmits a signature "range answer", i.e. a signal Dmsd, back to the terminal C via the subchannel multiplexer 91 (FIG. 7), wherein, when transmitting this signal Dmsd, the time of transmitting the answer, which corresponds to the time t3, is now also determined with the aid of a fast temporary memory, for example 103, 104 in FIG. 8.

The terminal time t4 of the receipt of the signature "range answer", i.e. the signal Dmec is detected in the terminal C. In addition, the measured values for the times t2 and t3 are transferred from the terminal D via the sub-channel to the terminal controller 83 (FIG. 6). In the process, the signal Kc is supplied via the OR-gate 85 to the locking circuits 103 and 104, so that the terminal controller 83 can determine the time t4.

Finally, the terminal controller 83 performs the calculation of the distance in accordance with the following equation:

$$L = c \cdot ((t4-t1)-(t3-t2))/2 - K_o,$$

wherein t4–t1 corresponds to the entire traveling time and t3–t2 to the processing time on the side of the opposite terminal D.

Figure 11:
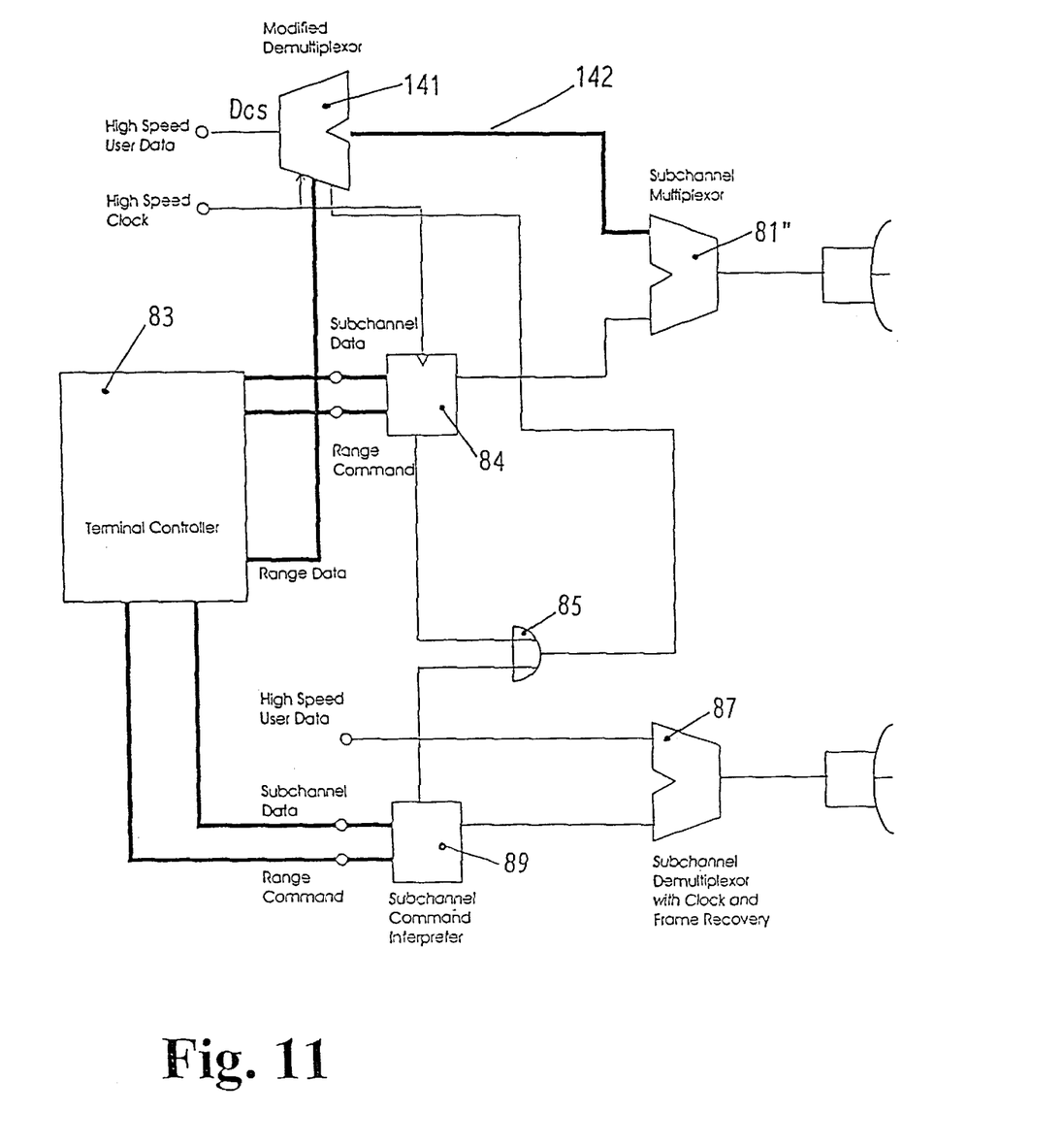

In contrast to the terminal C in FIG. 6, a variant of the station in FIG. 11 comprises an additional modified demodulator 141, who is provided on the input side with the already multiplexed useful data signals Dcs mentioned, which are transmitted at a high bit rate, and whose output side is connected to a simple sub-channel multiplexer 81" via a bus 142. Otherwise the elements 83, 84, 85, 87 and 89 with the corresponding buses and lines are equivalent in both FIGS. 6 and 11. But the output of the OR-gate 85 is connected with the control input of the modified demultiplexer 141, and the sub-channel controller 84 is provided with the same timing pulse Tsc as the demultiplexer 141. The multiplexers and/or demultiplexers can preferably be equipped with timing and frame recovery. The transmitter units 62, , , , and receiver units 68, . . . are only schematically represented in FIGS. 4 to 7. The devices in accordance with FIGS. 3 to 7 are basically symmetrical and interchangeable, if needed. They can therefore be employed as elements on the transmitter and/or receiver side.

What is claimed is:

1. A method for measuring the distance between a first station and a second station using a communications channel over which synchronization bits and other useful data is sent comprising the steps of:

transmitting a range request signal from said first station to said second station through said communications channel, wherein said range request signal is transmitted through said communications channel in the form of synchronization bit violations in which selected synchronization bits are replaced with the range request signal;

measuring a first station processing time ($T_1$);

receiving said range request signal at said second station;

formulating a range request answer at said second station and sending, again in the form of synchronization bit violations, that answer to said first station through said communications channel;

measuring a processing time ($T_2$) at said second station and sending said second station processing time to said first station through said communications channel;

measuring at said first station the total cycle time ($T_{cycle}$) between when said range request signal was initiated and when an answer from said second station was received at said first station;

calculating the signal travel time ($T_R$) between said first station and said second station by subtracting the first station processing time ($T_1$) and second station processing time ($T_2$) from the total cycle time ($T_{cycle}$); and, calculating the distance by multiplying the travel time ($T_R$) by the speed of the communication.

2. The method of measuring the distance between a first station and a second station as set forth in claim 1 wherein both said first station and said second station are satellites.

3. The method of measuring the distance between a first station and a second station as set forth in claim 2 wherein the speed of the communication is the speed of light (c).

4. The method of measuring the distance between a first station and a second station as set forth in claim 1 wherein said range request answer and said second station processing time ($T_2$) are sent simultaneously from said second station.

5. A method for measuring the distance (L) between a first station and a second station using a communications channel over which synchronization bits and other useful data is sent comprising the steps of:

providing an initiator signal to a controller in said first station;

upon receipt of said initiator signal in said first station controller, having said controller direct a first station counter to start a first station counting sequence using first timing pulses (Tsa);

generating a range request signal in said first station controller in response to said initiator signal and sending said range request signal to a second station receiver through said communications channel, wherein said range request signal is transmitted through said communications channel in the form of synchronization bit violations in which selected synchronization bits are replaced with the range request signal;

receiving said range request signal at said second station receiver and forwarding said range request signal to a second station discriminator to verify the authenticity of the range request;

after verification of said range request signal, having said second station discriminator both initiate a second station counting sequence in a second station counter having second timing pulses (Tsb) and direct a second station controller to prepare a range response answer;

transmitting, again in the form of synchronization bit violations, said range request answer back to said first station through said communications channel using a second station transmitter and, upon transmission, directing said second station counter to stop counting;

transmitting, once again in the form of synchronization bit violations, from said second station to said first station through said communications channel the latest reading (n2) on said second station counter;

upon receipt of the range request answer and latest second station counter reading (n2) at said first station, stopping said first station counter and obtaining the latest reading on said first station counter (n1);

calculating the distance (L) between said first station and said second station using the following equation:

$$L = c \times (n1 \times Tsa - n2 \times Tsb)/2 - K_o,$$

wherein c is the speed of light and Ko is a correction constant.

6. The method of measuring the distance between a first station and a second station as set forth in claim 5 wherein both said first station and said second station are satellites.

7. The method of measuring the distance between a first station and a second station as set forth in claim 5 wherein said first station initiator signal is generated in a first station terminal controller and provided to a first station sub-channel controller.

8. The method of measuring the distance between a first station and a second station as set forth in claim 7 wherein said first station terminal controller is used to calculate the distance.

9. A method for measuring the distance (L) between a first station and a second station using a communications channel over which synchronization bits and other useful data is sent comprising the steps of:

providing an initiator signal to a controller in said first station;

upon receipt of said initiator signal in said controller, said controller directing a first station memory to record a first terminal time (t1);

generating a range request signal in said first station controller in response to said initiator signal and sending said range request signal through said communications channel to a second station receiver, wherein said range request signal is transmitted through said communications channel in the form of synchronization bit violations in which selected synchronization bits are replaced with the range request signal;

receiving said range request signal at said second station receiver and forwarding said range request signal to a second station discriminator to verify the authenticity of said range request and activate a second station memory to store a second terminal time (t2);

after verification of said range request signal, having said second station discriminator direct a second station controller to prepare a range request answer;

transmitting, again in the form of synchronization bit violations, said range request answer back to said first station using a second station transmitter and, upon transmission, activating said second station memory to store a third terminal time (t3);

transmitting, once again in the form of synchronization bit violations, said second terminal time (t2) and third terminal time (t3) from said second station to said first station through said communications channel;

upon receipt of said range request answer and second station terminal times (t2, t3) at said first station, recording a fourth terminal time (t4) in said first station memory;

calculating the distance (L) between said first station and said second station using the following equation:

$$L = c \times (t4-t1) - (t3-t2))/2 - Ko,$$

wherein c is the speed of light and Ko is a correction constant.

10. The method of measuring the distance between a first station and a second station as set forth in claim 9 wherein both said first station and said second station are satellites.

11. The method of measuring the distance between a first station and a second station as set forth in claim 9 wherein said first station initiator signal is generated in a first station terminal controller and provided to a first station sub-channel controller.

12. The method of measuring the distance between a first station and a second station as set forth in claim 11 wherein said first station terminal controller is used to calculate the distance.

13. A device for measuring the distance between itself and a similar device using a communication channel over which synchronization bits and other useful data is sent comprising:

a controller to initiate the distance measurement process by generating a range request signal, to control a timing means which measures elapsed time and to calculate the desired distance using measurements of elapsed time;

a transmitter to send said range request signal in multiplexed form to said similar device over said communications channel;

a multiplexer for allowing transmission of said range request signal over said communications channel as synchronization bit violations multiplexed with other useful data, wherein said synchronization bit violations replace selected synchronization bits with the range request signal;

a timing means to measure elapsed time during the distance measurement process;

a receiver to receive both a range request answer and timing measurements from said similar device as synchronization bit violations multiplexed with other useful data; and a demultiplexer for isolating both said range request answer and timing measurements from said other useful data.

14. The device for measuring distance of claim 13 wherein said device is contained within a satellite.

15. The device for measuring distance of claim 13 wherein said timing means is a counter.

16. The device for measuring distance of claim 13 wherein said timing means is a sub-channel controller and memory.

* * * * *